(12) United States Patent
Nesbitt

(10) Patent No.: US 6,303,704 B1
(45) Date of Patent: Oct. 16, 2001

(54) METHOD OF IMPROVING SCUFF AND CUT RESISTANCE OF COVER FOR GAME BALL

(75) Inventor: R. Dennis Nesbitt, Westfield, MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/444,691

(22) Filed: Nov. 22, 1999

Related U.S. Application Data

(63) Continuation-in-part of application No. 09/236,848, filed on Jan. 25, 1999, now Pat. No. 6,099,416, which is a continuation-in-part of application No. 08/942,653, filed on Oct. 2, 1997, now Pat. No. 5,891,973, which is a continuation of application No. 08/595,898, filed on Feb. 6, 1996, now abandoned.

(51) Int. Cl.[7] ................................ A63B 37/12; C08J 3/24
(52) U.S. Cl. ........................ 525/333.8; 525/263; 525/314; 525/332.5; 525/387; 525/420; 475/378; 475/600
(58) Field of Search ...................................... 525/263, 314, 525/333.8, 387, 420, 332.5; 473/378, 600

(56) References Cited

U.S. PATENT DOCUMENTS 6,018,003 * 1/2000 Sullivan .

FOREIGN PATENT DOCUMENTS

1210698 * 10/1970 (GB) .
133440 * 10/1980 (JP) .

* cited by examiner

*Primary Examiner*—David J. Buttner

(57) ABSTRACT

Disclosed herein is a game ball and method for making the same. The game ball has a non-ionomeric cover which has been crosslinked by incorporating a dialkyl peroxide in the polymer mix prior to molding. The game ball cover is superior in at least one of cut resistance and scuff resistance to a conventional cover that does not have covalent crosslinks but is otherwise substantially identical in composition. The game ball cover of the invention is particularly useful for improving the durability of golf balls to be struck with sharp-grooved clubs. The peroxide may be omitted and the cover crosslinked using post formation irradiation.

18 Claims, No Drawings

METHOD OF IMPROVING SCUFF AND CUT RESISTANCE OF COVER FOR GAME BALL

RELATED APPLICATIONS

This application is a continuation-in-part of U.S. application Ser. No. 09/236,848 filed Jan. 25, 1999, now U.S. Pat No. 6,099,416 which, in turn, is a continuation-in-part of U.S. application Ser. No. 08/942,653 filed Oct. 2, 1997, now U.S. Pat. No. 5,891,973 issued Apr. 5, 1999, which is a continuation of U.S. application Ser. No. 08/595,898 filed Feb. 6, 1996, now abandoned.

BACKGROUND OF THE INVENTION

This invention relates generally to game balls, and more particularly to a game ball, such as a golf ball, having a cover formed predominantly from a non-ionomer polymeric material.

Before the development of ionomers, balata was the preferred material for golf ball covers. Polyethylene also was proposed for use as a golf ball cover material but was generally deemed highly inferior to balata in imparting playability and durability characteristics to the ball due to its brittleness and high hardness, and thus never became a commercially successful golf ball cover material.

Balata golf ball covers have now been replaced to a great extent by ionomeric cover materials. Ionomers are copolymers of an olefin and an α, β-ethylenically unsaturated carboxylic acid with a portion of the carboxylic acid groups neutralized by a metal ion. The metal ions serve as crosslinking agents, as they are ionically bonded to carboxylic acid groups in adjacent copolymer chains. Instead of having thermally irreversible covalent bonding, ionomers have thermolabile crosslinking bonds in which metal ions become part of the chemical structure of the ionomer upon crosslinking, and these crosslinks are reversible. For purposes of this application, this type of crosslinking is referred to as ionic crosslinking. One of the advantages of ionic crosslinking in golf ball materials is the ability of ionic bonds to re-form after breaking as a result of processing at elevated temperatures.

There are numerous advantages to the use of ionomers in making golf ball covers. On the other hand, one drawback of conventional golf balls with soft ionomeric covers are that the covers are prone to scuffing and cutting, particularly when hit with irons which have sharp grooves. It would be useful to develop a golf ball with a soft cover which is highly resistant to cutting and scuffing by sharp-grooved clubs.

SUMMARY OF THE INVENTION

An object of the invention is to provide a non-ionomeric game ball cover having improved scuff resistance and/or cut resistance.

Another object of the invention is to provide a method for imparting improved scuff resistance and/or cut resistance to a game ball cover.

Yet another object of the invention is to provide a golf ball with a soft cover which is well-suited for use with golf club irons having sharp grooves.

Yet another object of the invention is to provide a method of forming a golf ball with a soft cover which has excellent scuff resistance and/or cut resistance.

Other objects will be in part obvious and in part pointed out more in detail hereinafter.

The invention in a preferred form is a game ball having a cover comprised predominantly of a non-ionomer resin. The resin advantageously has a sufficient degree of covalent crosslinking to impart to the cover improved resistance to at least one of scuffing and cutting. In a particularly preferred form of the invention, the game ball is a golf ball and, preferably, has a dimpled surface. The covalent crosslinking preferably comprises peroxide or irradiation-induced covalent crosslinking.

In a preferred form of the invention, the degree of covalent crosslinking is appropriate to impart to the cover a Shore D hardness which is no more than about 10% greater, and more preferably no more than about 5% greater, than the Shore D hardness of a cover having an identical composition but which does not include a substantial degree of peroxide or radiation-induced covalent crosslinking.

Another preferred form of the invention is a method of treating a game ball. The method comprises the steps of obtaining a game ball having a cover comprised predominantly of a non-ionomer polymeric resin, and irradiating the resin in the cover under conditions appropriate to covalently crosslink the cover material in order to increase the resistance of the cover to at least one of scuffing and cutting without substantially impairing other playability or physical characteristics of the ball. In a particularly preferred form of the invention, the game ball is a golf ball. Preferably, the game ball has a dimpled surface.

Alternatively, the cover material can be formulated with an effective amount of peroxide to achieve the desired crosslinking and improved scuff and cut resistance. The peroxide-containing non-ionomeric polymers are formulated, milled, sheeted and chopped in a typical fashion and used to mold covers on standard golf ball cores. During the molding operation, the cover material is subjected to heat and pressure to effect the curing of the polymeric material.

According to the preferred method of the invention, the game ball cover is subjected to gamma radiation treatment at a dosage of at least 2 megarads. The game ball cover preferably is irradiated prior to application of a top coat over the cover. The method of the invention preferably further includes the step of applying a top coat over the cover before or after irradiation.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

The game balls of the present invention are surprisingly superior in their scuff (abrasion) resistance and cut resistance to conventional game balls which have not been crosslinked, and which contain similar quantities of non-ionomeric compositions, such as polyurethanes, with similar properties of compression, coefficient of restitution (COR) and hardness.

In accordance with one aspect of the invention, the cover compositions and resulting molded covers of the present invention are manufactured using relatively conventional techniques. In this regard, the compositions of the invention preferably are based on a variety of materials blended together with peroxide crosslinking agents and minor amounts of secondary constituents such as co-crosslinking agents, fillers and the like. Peroxides which are readily available are conveniently used in the present invention, generally in amounts of from about 0.1 to about 10.0 and preferably in amounts of from about 0.3 to about 3.0 parts by weight of 40% active peroxide per each 100 parts of base polymer material.

Exemplary of suitable peroxides for the purposes of the present invention are dialkyl peroxides such as dicumyl peroxide, n-butyl 4,4'-bis (butylperoxy) valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of crosslinking agent used will vary depending on the specific end product desired and the particular initiators employed. Commercially available peroxides include n-butyl 4,4-bis (butylperoxy) valerate having a one hour half life at about 112° C., and 1,1-bis(t-butylperoxy-3,3,5-trimethyl cyclohexane having a one hour half life at about 129° C.

In producing golf ball covers utilizing the present compositions, the ingredients may be intimately mixed using, for example, two roll mills or a Banbury® mixer until the composition is uniform, usually over a period of from about 5 to about 20 minutes. The sequence of addition of the components is not critical. A preferred blending sequence is as follows.

The primary polymeric material, crosslinking agent, fillers and the like are blended for about 7 minutes in an internal mixer such as a Banbury® mixer. As a result of shear during mixing, the temperature may rise to about 200° F. The mixing is desirably conducted in such a manner that the composition does not reach incipient polymerization temperatures during the blending of the various components. The batch is discharged onto a two roll mill, mixed for about one minute and sheeted out, following which it is chopped into granular form and molded as half shells. The molding process is carried out preferably at pressures up to 5 tons and temperatures of 200° to 250° C. for a heating time of 5 to 20 minutes in the mold.

Usually the curable component of the composition will be cured by heating the composition at elevated temperatures on the order of from about 275° F. to about 350° F., preferably and usually from about 290° F. to about 350° F., preferably and usually from about 290° F. to about 325° F., with compression molding of the cover composition around a solid core being effected simultaneously with the curing or crosslinking thereof. When the composition is cured by heating, the time required for heating will normally be short, generally from about 2 to about 20 minutes, depending upon the particular curing or crosslinking agent used and method of molding. Those of ordinary skill in the art relating to peroxide crosslinking agents are conversant with adjustments of cure times and temperatures required to effect optimum results with any specific composition. The ball is cooled at 50° to 70° F. for about 2 to 7 minutes to fuse the shells together to form a dimpled golf ball of a diameter of 1.680 inches or more.

After molding, the golf balls produced may undergo various further processing steps such as buffing, painting and marking as disclosed in U.S. Pat. No. 4,911,451.

The preferred fillers are relatively inexpensive and heavy and serve to lower the cost of the ball and to increase the weight of the ball to closely approach the U.S.G.A. weight limit of 1.620 ounces. However, if thicker cover compositions are to be applied to the core to produce larger than normal (i.e. greater than 1.680 inches in diameter) balls, use of such fillers and modifying agents will be limited in order to meet the U.S.G.A. maximum weight limitations of 1.620 ounces. Exemplary fillers include mineral fillers such as zinc oxide, limestone, silica, mica, barytes, lithopone, zinc sulphide, talc, calcium carbonate, clays, powdered metals and alloys such as bismuth, brass, bronze, cobalt, copper, iron, nickel, tungsten, aluminum, tin, etc. Limestone is ground calcium/magnesium carbonate and is used because it is an inexpensive, heavy filler.

The game balls of the invention subject to irradiation are formed by first obtaining an uncoated or coated game ball. An "uncoated" game ball as the term is used in this application is a one, two, or multi-piece game ball to which no primer or top coat has been applied over the cover. In contrast, a "coated" game ball as this term is used in this application is a ball which has a primer coat and/or a top coat over the cover layer. The coated or uncoated game ball of the invention is subjected to irradiation under conditions appropriate to induce covalent crosslinking of the polymeric cover material. This type of direct covalent bonding has been found to take place in cover materials when peroxides are added to the cover formulation prior to molding or when gamma radiation treatment is applied at a dosage of 2 or more megarads. It is expected to be useful also at lower dosages, for example, 1 megarad.

For clarity of description and ease of understanding, the invention is being described in connection with golf balls although it will be understood that other game balls, including but not limited to softballs, basketballs, baseballs, soccer balls, volleyballs, street hockey balls, footballs, and the like, can advantageously employ the features of the present invention.

The ball has a core, which is solid, or is formed from any other suitable type of core composition such as a wound core. A cover surrounds the core. A thin primer coat is applied to the outer surface of cover. A thin top coat surrounds the primer coat.

In accordance with the present invention, peroxides are blended into the cover formulation prior to molding or, alternatively, after the cover layer is formed over the core, the cover layer is subjected to irradiation at a dose of about 1 or more megarads in order to covalently crosslink the cover material. Particularly good results are obtained with less than 10 percent by weight of peroxide and when the irradiation dosage is 2–15 megarads. In a most preferred form of the invention, a dosage of 3–12 megarads is utilized. As used herein, the term "irradiation" refers to short-duration irradiation using gamma rays, an electron beam or the like, rather than to mere exposure to sunlight, which would result in a dosage of well below 1 megarad. Irradiation takes place at a temperature below the melting or deformation temperature of the cover layer, and for convenience preferably takes place at ambient temperature.

The cover can be irradiated prior to or after application of primer coat and top coat. Furthermore, primer coat can be eliminated if adhesion of top coat to cover is sufficient to render the ball suitable for competitive play, as is commonly the case with softballs and baseballs, and may also be the case for other game balls.

The game ball of the invention can be irradiated with electrons, neutrons, protons, gamma rays, x-rays, helium nuclei, or the like. In a particularly preferred form of the invention, the scuff and cut resistance of cover 12 is enhanced by subjecting the cover to gamma rays or electron beam treatment at a dosage sufficient to significantly improve scuff resistance and COR without excessively hardening the compression or adversely impacting the properties of the core. The game ball preferably obtains an improvement in COR of at least 0.5% as a result of irradiation of the cover.

The cover composition preferably contains high quantities of non-ionomer resins. However, the irradiated cover material may have a combination of ionic crosslinks and covalent crosslinks. The polymers typically, although not necessarily, have a Shore D hardness in the range of 20–70. It will be appreciated that non-ionomeric materials can be blended with ionomer as long as an acceptable increase in scuff resistance and/or cut resistance is obtained as a result of covalent crosslinking of the blend. Non-limiting examples of the non-ionomeric materials include ethylene-ethyl acrylate, ethylene-methyl acrylate, ethylene-vinyl acetate, low density polyethylene, linear low density polyethylene, metallocene catalyzed polyolefins such as ENGAGE polyolefins available from Dow Chemical and EXACT polyolefins available from Exxon, (maleated metallocenes which have improved compatibility with the ionomeric material are preferred), polyamides including nylon copolymers such as Nylon 6 and Nylon 66, as well as nylon-ionomer graft copolymers such as CAPRON 8351 available from Allied Signal, non-ionomeric acid copolymers such as PRIMACOR, available from Dow Chemical, and NUCREL, available from DuPont, and a variety of thermoplastic elastomers, including styrene-butadiene-styrene block copolymers such as KRATON available from Shell, SANTOPRENE available from Monsanto, thermoplastic block polyamides such as PEBAX and similar polyester amides, polyurethanes, polyureas, thermoplastic block polyesters, such as HYTREL available from DuPont, functionalized (e.g., maleic anhydride modified) ethylene propylene elastomers such as EPR and EPDM, and syndiotactic resins such as syndiotactic 1,2-polybutadiene alone or in combination with other dienes, such as VCR-412 (Ubepol, Japan) which combines cis 1,4-butadiene with the syndiotactic 1,2-polybutadiene (M.P. 202° C.). Other elastomers capable of being crosslinked by irradiation include materials such as acrylic, epichlorohydrin, isoprene-acrylonitrile, nitrile, cis 1,4 polybutadiene, polychloroprene, polyisoprene, natural rubber, silicone, styrene-butadiene and urethane.

In order to obtain the desired Shore D hardness, it may be necessary to add one or more crosslinking monomers and/or reinforcing agents to the polymer composition. Nonlimiting examples of crosslinking monomers which can be used according to the invention are zinc diacrylate, zinc dimethacrylate, ethylene dimethacrylate (e.g., SR-297, Sartomer Company), trimethylol propane triacrylate. If crosslinking monomers are used, they typically are added in an amount of 3–40 parts by weight based upon 100 parts by weight of polymer, and more preferably 5–30 parts by weight. A nonlimiting example of a suitable reinforcing agent is fine particle silica, such as HiSil 233 from PPG, Pittsburgh, Pa. Reinforcing agents typically are used in an amount of 3–60 parts by weight based upon 100 parts by weight of polymer, and more preferably 5–50 parts by weight. Coupling agents such as A-172 from Union Carbide of Danbury, Conn. can be used at a level of about 1% to increase the physical properties of the compound.

If the game ball cover is irradiated prior to application of a primer coat and/or top coat, there is no particular restriction on the type of primer coat and/or top coat to be used. If irradiation occurs after application of a primer coat and/or a top coat over the cover, it is important to ensure that the radiation will penetrate the coating and that the dosage of radiation is sufficient to covalently crosslink the cover material without adversely affecting the properties of the primer and/or top coat to a substantial degree. Due to the thinness of the primer coat and top coat on most game balls, including golf balls, it has been found that little change in radiation dosage is required if irradiation occurs after application of such coatings.

Golf balls according to the invention preferably have a post-irradiation PGA compression of 10–110. In a particularly preferred form of the invention, the golf balls have a PGA compression of about 40–100 after irradiation. It has been found that excellent results are obtained when the post-irradiation PGA compression of the golf balls is 60–100. The irradiation method of the invention preferably results in an increase in PGA compression of at least 5% as compared to the PGA compression of the ball prior to treatment. The coefficient of restitution of the golf balls of the invention after treatment is at least about 0.780 or greater. Preferably, the COR of the golf balls is in the range of 0.790–0.830 and most preferably 0.800–0.830. The Shore D hardness of the golf balls of the invention after irradiation is in the range of 25–80. Particularly good results are obtained when the Shore D hardness of the golf balls is in the range of 30–70, and most preferably 35–60.

The invention is particularly well suited for use in making dimpled, pebbled, and other game balls which do not have a smooth outer surface, including game balls with simulated stitching. A smooth ball is less susceptible to scuffing than a dimpled ball since dimples give the golf club groove a sharp-edged surface to "catch." Pebbles clearly are susceptible to shearing when dribbled on a hard surface, or the like. Likewise on a molded-cover softball, the stitching is a raised area that will be sheared or compressed more than the smooth-surfaced area by a bat and/or by the turf, dirt, etc.

One embodiment of a method for radiation treating golf balls according to the invention can be described. The golf ball is placed on a channel along which it slowly moves. Radiation from a source contact the surface of the ball. The source is positioned to provide a generally uniform dose of radiation on the entire surface of the ball as the ball rolls along the channel. The balls are irradiated with a dosage of 1 or more megarads, more preferably 2–15 megarads. The intensity of the dosage preferably is in the range of 1–20 MeV.

The golf balls of the invention are found to exhibit a scuff resistance in the range of 1–3 on a scale of 1–4. It is preferred that the treatment be appropriate to provide the golf balls with a scuff resistance of 1–2.5, and more preferably 1–2. Golf balls according to the invention have a cut resistance in the range of 1–3 on a scale of 1–5. It is preferred that the golf balls of the invention have a cut resistance of 1–2.5 and most preferably 1–2.

The scuff resistance test was conducted in the following manner: a Top-Flite Tour sand wedge with box grooves cut to 0.025" wide with no post formation sandblasting was obtained and was mounted in a Miyamae driving machine. The club face was oriented for a square hit. The forward/backward tee position was adjusted so that the tee was four inches behind the point in the downswing where the club was vertical. The height of the tee and the toe-heel position of the club relative to the tee were adjusted in order that the center of the impact mark was about ¾ of an inch above the sole and was centered toe to heel across the face. The machine was operated at a clubhead speed of 58 miles per hour. Three samples of each ball were tested. Each ball was hit three times and the clubface was brushed clean after each hit. After testing, the balls were rated from 1 to 6 with 1 being the best and 6 being the worst. A difference of two rankings is considered a highly significant difference.

Cut resistance was measured in accordance with the following procedure: A golf ball was firmly held in a cavity to expose the top half of the ball. A guillotine style blade weighing five pounds and having inner and outer blade edge angles of 90° and 60° respectively and a cutting edge of three sixty-fourths inch radius is dropped from a height of 3.5 feet to strike the ball at a point one-half inch off the top center point. The guillotine blade is guided during the drop by means of a substantially friction-free vertical track.

The cut resistance of the balls tested was evaluated on a scale of 1–5.
Rating

Type of Damage

5 A cut that extends completely through the cover to the core
4 A cut that does not extend completely through but that does break the surface
3 Does not break the surface but does leave a permanent dent
2 Leaves a slight crease which is permanent but not as severe as 3
1 Virtually no visible indentation or damage of any sort It has been found that golf ball covers crosslinked with peroxides or treated according to the irradiation technique of the present invention exhibit particular improvement in scuff and/or cut resistance. This improvement is particularly significant when the golf balls are struck with a square-grooved iron. It is has been found that square-grooved irons and other sharp-grooved irons tend to abrade and damage golf ball covers more readily than irons having "V-type" grooves.

Having generally described the invention, the following examples are included for purposes of illustration so that the invention may be more readily understood and are in no way intended to limit the scope of the invention unless otherwise specifically indicated.

EXAMPLE 1

A cover material was prepared having the following formulation in parts by weight:

| Component | Amount |
| --- | --- |
| High styrene content SBR | 100 |
| Precipitated silica | 20 |
| Titanium dioxide | 2 |
| Trimethylol propane trimethacrylate | 5 |
| Silane A-172 coupling agent | 0.3 |

The high styrene content SBR is a blend of 60% styrene-butadiene and 40% of a high styrene resin.

The material was milled, formed into a sheet and tested for hardness before and after gamma radiation at different dosage levels. The resultant hardness values are set forth in Table 1.

The material was milled, formed into a sheet having a thickness of 0.130 inch and cut into squares having a size of 2"×2". Half shells were compression molded using a single female smooth cavity of 1.680" diameter and a 1.624" male smooth cavity. Two resultant half shells were placed around a 1.545" "Z Balata" solid core and placed in a dimpled cavity mold for final molding. The resultant balls were tested for scuff and cut resistance using the procedures outlined herein with no irradiation and following six magarads of irradiation. The results are set forth in Table 2.

EXAMPLE 2

The procedure of Example 1 was repeated except that the high styrene resin was replaced with a syndiotactic resin, namely VCR412 (Ubepol, Japan), which is cis 1,4-butadiene rubber combined with syndiotactic 1,2 polybutadiene (M.P. 202° C.). The resultant hardness values are reported in Table 1, while the scuff and cut resistance can be found in Table 2.

EXAMPLE 3

The procedure of Example 1 was repeated except that the formulation was changed to the following:

| Component | Amount |
| --- | --- |
| EPDM Ethylene propylene diene monomer | 100 |
| Precipitated silica | 35 |
| Titanium dioxide | 2 |
| Trimethylol propane trimethacrylate | 10 |
| Silane -A-172 | 0.3 |

The resultant hardness results are reported in Table 1 and the scuff and cut resistance ratings are in Table 2.

TABLE 1

| Cover Material | Dosage (Megarads | Shore D |
| --- | --- | --- |
| Example 1 | 3.5 | 50 |
|  | 7.0 | 50 |
|  | 12.0 | 52 |
|  | 0 | 28 |
| Example 2 | 3.5 | 25 |
|  | 7.0 | 28 |
|  | 12.0 | 30 |
|  | 0 | 8 |
| Example 3 | 3.5 | 33 |
|  | 7.0 | 35 |
|  | 12.0 | 37 |
|  | 0 | 13 |

As indicated in Table 2, the scuff and cut resistance of the balls increased substantially as a result of the irradiation treatment.

TABLE 2

| Cover Material | Irradiation | Scuff | Cut |
| --- | --- | --- | --- |
| Example 1 | No | 4 | 4 |
|  | Yes | 2 | 3 |
| Example 2 | No | 3 | 5 |
|  | Yes | 2 | 2 |
| Example 3 | No | 2 | 4 |
|  | Yes | 1 | 1 |
| Commercial ionomer cover control |  | 3 | 2 |

EXAMPLE 4

A composition similar to Example 3 was prepared but employed a peroxide crosslinking agent and no irradiation. The formula was changed slightly to the following:

| Component | Amount |
| --- | --- |
| EPDM (Ethylene propylene diene monomer) | 100 |
| Precipitated silica | 40 |
| Titanium dioxide | 2.3 |
| Trimethylol propane trimethacrylate | 10 |

-continued

| Component | Amount |
|---|---|
| Silane A-172 | 0.3 |
| 1,1-Di(t-butylperoxy)3,3,5-trimethyl cyclohexane | 6.0 |

The composition was blended in a Banbury® mixer, formed into a sheet and chopped into granules. The chopped granules, 6.7 grams, were placed in female hemisphere molds and premolded under 5 tons of pressure for 12 minutes with heating up to 215° F. using a female cavity of 1.680" diameter and a 1.624" male cavity. The resultant shells were molded around a 1.680"Z-Balata" solid core in a dimpled cavity mold at 10 tons of pressure for 8 minutes to a maximum mold temperature of 313° F. The resultant golf balls were trimmed and tested. The balls exhibited a Shore D hardness of 50, a compression of 64 and a COR of 0.765. The balls passed the guillotine cut test with no visible indentation or damage and the scuff test with almost no markings. Commercially available balls all exhibited a scuff ranking of 3 or higher.

EXAMPLE 5

The procedure of Example 4 was repeated except that no peroxide was used and the resultant balls were irradiated with a 6 megarad dosage. When subject to the cut and scuff tests the balls gave results substantially the same as the balls of Example 4. After treatment the balls had a Shore D hardness of 45.

As will be apparent to persons skilled in the art, various modifications and adaptations of the structure above described will become readily apparent without departure from the spirit and scope of the invention, the scope of which is defined in the appended claims.

EXAMPLE 6
(Prophetic)

The formulation of Example 1 is prepared with the exception that 1.6 parts by weight of peroxide curing agent is also added. The composition was blended in a Banbury® mixer, formed into a sheet and chopped into granules. The chopped granules, 6.7 grams, were placed in female hemisphere molds and premolded under 5 tons of pressure for 12 minutes with heating up to 215° F. using a female cavity of 1.680" diameter and a 1.624" male cavity. The resultant shells were molded around a 1.680"Z-Balata" solid core in a dimpled cavity mold at 10 tons of pressure for 8 minutes to a maximum mold temperature of 313° F.

EXAMPLE 7
(Prophetic)

The formulation of Example 2 is prepared with the exception that 0.8 parts of peroxide curing agent is also added. The composition was blended in a Banbury® mixer, formed into a sheet and chopped into granules. The chopped granules, 6.7 grams, were placed in female hemisphere molds and premolded under 5 tons of pressure for 12 minutes with heating up to 215° F. using a female cavity of 1.680" diameter and a 1.624" male cavity. The resultant shells were molded around a 1.680" Z-Balata" solid core in a dimpled cavity mold at 10 tons of pressure for 8 minutes to a maximum mold temperature of 313° F.

What is claimed is:

1. A game ball having a center and a cover, the cover comprised predominantly of a non-ionomer resin having a sufficient degree of peroxide induced covalent crosslinking to impart to the cover improved resistance to at least one of scuffing and cutting, the resin being selected from the group consisting of polyamides, block copolymers, ethylene propylene elastomers, and polyamide block copolymers, scuff and cut resistance being in the range of about 1–2.

2. The game ball according to claim 1, wherein the ball is a golf ball and the degree of covalent crosslinking is sufficient to impart to the ball a PGA compression which is at least 5% harder than the PGA compression of a golf ball with a cover having a substantially identical composition but which does not have a substantial degree of covalent crosslinking.

3. The game ball according to claim 1, wherein the peroxide is a dialkyl peroxide.

4. The game ball of claim 1 wherein the peroxide is 1,1-di(t-butylperoxy)3,3,5-trimethyl cylcohexane.

5. The game ball according to claim 1, wherein the degree of covalent crosslinking is sufficient to impart to the ball a coefficient of restitution which is at least 0.50% greater than a coefficient of restitution of a ball with a cover having a substantially identical composition but which does not have peroxide-induced covalent crosslinking.

6. The game ball according to claim 1, wherein the degree of covalent crosslinking is appropriate to impart to the cover a Shore D hardness which is no more than about 10% greater than the Shore D hardness of a cover having a substantially identical composition but which does not include a substantial degree of covalent crosslinking.

7. The game ball according to claim 1, wherein the cover has a Shore D hardness of about 70 or less.

8. The game ball according to claim 1, wherein the non-ionomeric material is an ethylene propylene diene monomer.

9. The game ball according to claim 1, wherein the non-ionomeric material is a polyamide.

10. The game ball according to claim 1, wherein the non-ionomeric material is a block copolymer.

11. A golf ball having a core and a cover, the cover comprised predominantly of a non-ionomer resin having a sufficient degree of peroxide induced covalent crosslinking to impart to the cover improved resistance to at least one of scuffing and cutting, the resin being selected from the group consisting of polyamides, block copolymers, ethylene propylene elastomers, and polyamide block copolymers, scuff and cut resistance being in the range of about 1–2.

12. The golf ball according to claim 11, wherein the non-ionomeric material is an ethylene propylene diene monomer.

13. The golf ball according to claim 11, wherein the peroxide is a dialkyl peroxide.

14. The golf ball of claim 11 wherein the peroxide is 1,1-di(t-butylperoxyl)3,3,5-trimethyl cylcohexane.

15. The golf ball according to claim 11, wherein the degree of covalent crosslinking is sufficient to impart to the ball a coefficient of restitution which is at least 0.50% greater than a coefficient of restitution of a ball with a cover having a substantially identical composition but which does not have peroxide-induced covalent crosslinking.

16. The golf ball according to claim 11, wherein the degree of covalent crosslinking is appropriate to impart to the cover a Shore D hardness which is no more than about 10% greater than the Shore D hardness of a cover having a substantially identical composition but which does not include a substantial degree of covalent crosslinking.

17. The golf ball according to claim 11, wherein the cover has a Shore D hardness of about 70 or less.

18. The golf ball of claim 11, wherein the degree of peroxide-induced covalent crosslinking is sufficient to substantially improve the resistance of the cover to at least one of scuffing and cutting while resulting in a cover hardness (Shore D) which is no more than about 5.0% higher than the Shore D hardness of a cover which is substantially identical in composition but does not contain covalent crosslinking.

* * * * *

US006303704C1

(12) EX PARTE REEXAMINATION CERTIFICATE (5209th)
United States Patent
Nesbitt

(10) Number: US 6,303,704 C1
(45) Certificate Issued: Sep. 27, 2005

(54) METHOD OF IMPROVING SCUFF AND CUT RESISTANCE OF COVER FOR GAME BALL

(75) Inventor: R. Dennis Nesbitt, Westfield, MA (US)

(73) Assignee: Callaway Golf Company, Carlsbad, CA (US)

Reexamination Request:
  No. 90/006,593, Apr. 7, 2003

Reexamination Certificate for:
  Patent No.: 6,303,704
  Issued: Oct. 16, 2001
  Appl. No.: 09/444,691
  Filed: Nov. 22, 1999

Related U.S. Application Data

(63) Continuation-in-part of application No. 09/236,848, filed on Jan. 25, 1999, now Pat. No. 6,099,416, which is a continuation-in-part of application No. 08/942,653, filed on Oct. 2, 1997, now Pat. No. 5,891,973, which is a continuation of application No. 08/595,898, filed on Feb. 6, 1996, now abandoned.

(51) Int. Cl.$^7$ .............................. A63B 37/12; C08J 3/24
(52) U.S. Cl. ..................... 525/333.8; 473/378; 473/600; 473/332.5; 473/387; 473/420; 525/263; 525/314; 525/332.5; 525/387; 525/420
(58) Field of Search .......................... 525/333.8, 263, 525/314, 332.5, 387, 420; 473/378, 600

(56) References Cited

U.S. PATENT DOCUMENTS

| 2,805,072 A | 9/1957 | Smith |
| 3,534,965 A | 10/1970 | Harrison et al. ............ 273/218 |
| 3,572,721 A | 3/1971 | Harrison et al. ............ 372/218 |
| 4,884,814 A | 12/1989 | Sullivan .................. 273/235 R |
| 5,253,871 A | 10/1993 | Viollaz ........................ 273/228 |
| 5,320,345 A | 6/1994 | Lai et al. .................. 273/58 R |
| 5,779,561 A | 7/1998 | Sullivan et al. ............. 473/373 |
| 5,779,562 A | 7/1998 | Melvin et al. .............. 473/373 |
| 5,935,021 A | 8/1999 | Kashiwagi et al. ......... 473/365 |
| 5,971,870 A | 10/1999 | Sullivan et al. ............. 473/373 |
| 6,018,003 A | 1/2000 | Sullivan et al. .......... 525/333.8 |
| 6,152,835 A | 11/2000 | Sullivan et al. ............. 473/373 |

FOREIGN PATENT DOCUMENTS

| JP | 55-133440 A2 | * 10/1980 |
| WO | WO 99/54001 | 10/1999 |
| WO | WO 00/43078 | 7/2000 |

OTHER PUBLICATIONS

Nudel'man et al, Chemical abstracts accession No. 1994:535959, Kauchuk i Rezina (1993), vol. 6, abstract.*
Nudel'man et al., Chemical abstracts accession No. 1994:437386, Kauchuk i Rezina (1993), vol. 6, abstract.*

* cited by examiner

Primary Examiner—Robert Sellers

(57) ABSTRACT

Disclosed herein is a game ball and method for making the same. The game ball has a non-ionomeric cover which has been crosslinked by incorporating a dialkyl peroxide in the polymer mix prior to molding. The game ball cover is superior in at least one of cut resistance and scuff resistance to a conventional cover that does not have covalent crosslinks but is otherwise substantially identical in composition. The game ball cover of the invention is particularly useful for improving the durability of golf balls to be struck with sharp-grooved clubs. The peroxide may be omitted and the cover crosslinked using post formation irradiation.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–18 are cancelled.

\* \* \* \* \*